O. M. PRINCE.
TURNTABLE FOR MOTOR VEHICLES.
APPLICATION FILED MAY 3, 1920.
1,404,479.
Patented Jan. 24, 1922.
3 SHEETS—SHEET 1.
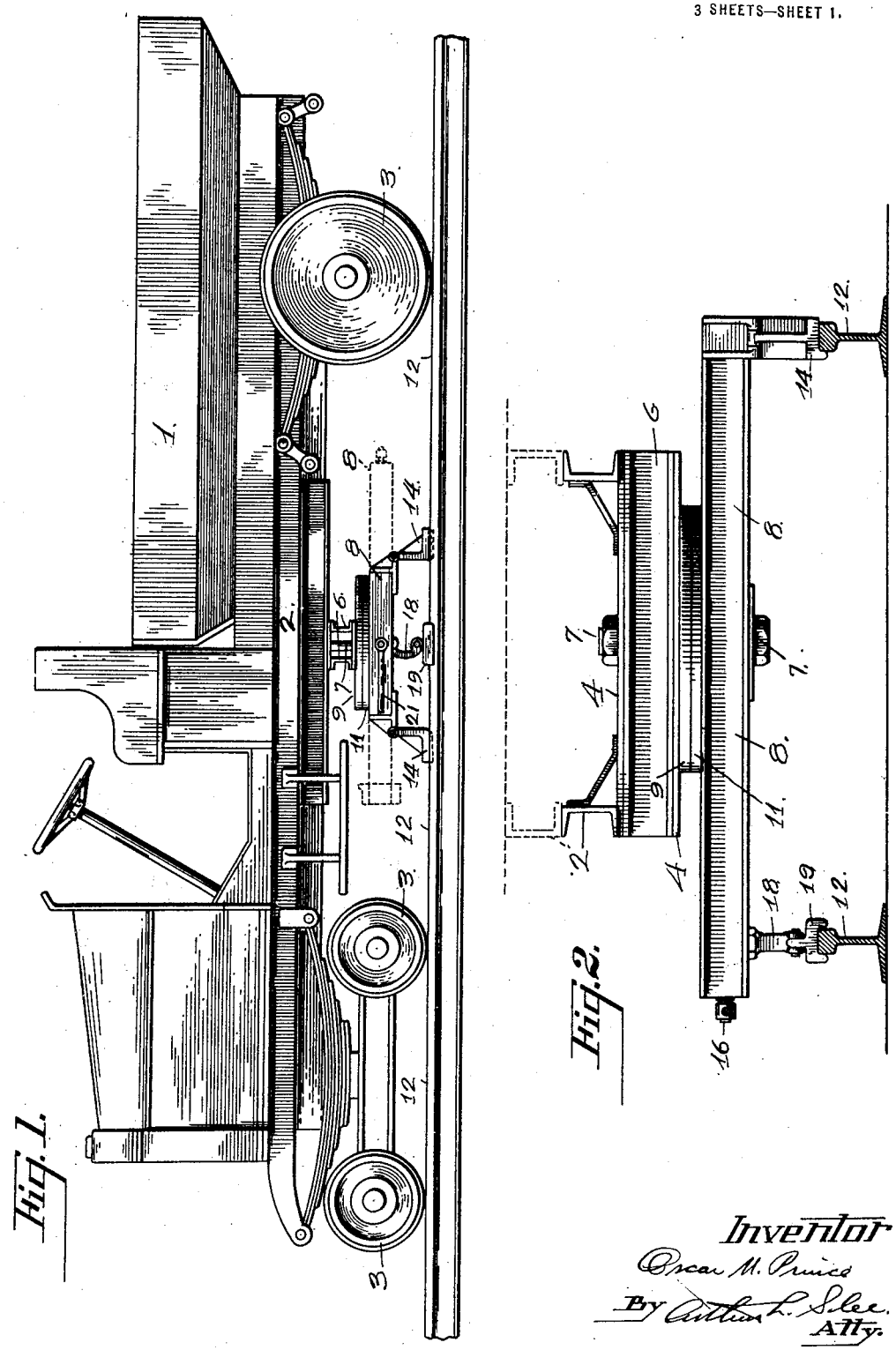

O. M. PRINCE.
TURNTABLE FOR MOTOR VEHICLES.
APPLICATION FILED MAY 3, 1920.

1,404,479.

Patented Jan. 24, 1922.
3 SHEETS—SHEET 2.

Inventor
Oscar M. Prince
By Arthur L. Slee
Atty.

O. M. PRINCE.
TURNTABLE FOR MOTOR VEHICLES.
APPLICATION FILED MAY 3, 1920.
1,404,479.
Patented Jan. 24, 1922.
3 SHEETS—SHEET 3.
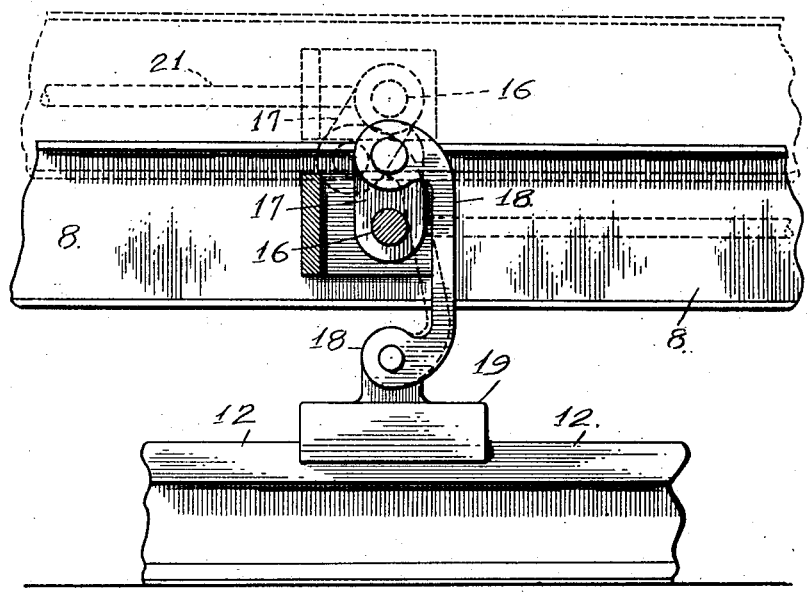
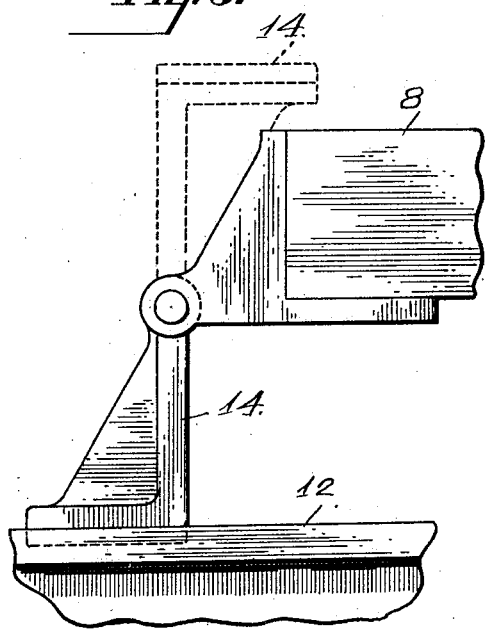
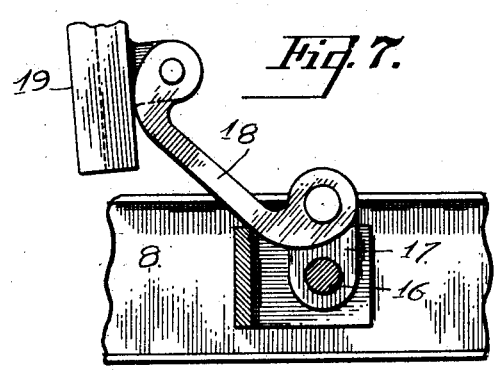
Inventor
Oscar M. Prince
By Arthur L. Slee.
Atty.

UNITED STATES PATENT OFFICE.

OSCAR M. PRINCE, OF SAN FRANCISCO, CALIFORNIA.

TURNTABLE FOR MOTOR VEHICLES.

1,404,479.  Specification of Letters Patent. Patented Jan. 24, 1922.

Application filed May 3, 1920. Serial No. 380,377.

*To all whom it may concern:*

Be it known that I, OSCAR M. PRINCE, a citizen of the United States, and a resident of the city and county of San Francisco, and State of California, have invented a new and useful Improvement in a Turn-table for Motor Vehicles, of which the following is a specification.

My invention relates to improvements in turn tables for motor vehicles and the like wherein a pivotally mounted member operates in conjunction with elevating means to raise the vehicle clear of the ground or rails to facilitate reversal of the position of said vehicle upon said ground or rails.

The primary object of my invention is to provide improved means for elevating a motor vehicle and the like to clear the wheels thereof from the ground to facilitate reversal of the position of said vehicle within the shortest possible distance.

It is also an object of the present invention to provide improved means for pivotally supporting a motor vehicle or the like above its transit base whereby said vehicle may be easily and readily turned upon its center of gravity to reverse the position thereof.

I accomplish these and other objects by means of the improved device disclosed in the drawings forming a part of the present specification wherein like characters of reference are used to designate similar parts throughout the said specification and drawings, and in which—

Fig. 1 is an elevation of a motor vehicle disclosing my improvement attached thereto, the operative position being disclosed in full lines and the inoperative position being disclosed in dotted lines.

Fig. 2 is an enlarged cross sectional view of the rails disclosing the device in operative position, the chassis of the vehicle being indicated in dotted lines;

Fig. 5 is an enlarged broken detailed view of a portion of the frame and the elevating shoe and mechanism therefor;

Fig. 6 is a broken elevation of the supporting shoes and a portion of the operative and inoperative positions of said shoes being disclosed in full and dotted lines respectively; and Fig. 7 is a broken detailed view of the elevating shoe in an inoperative position.

Figure 3:
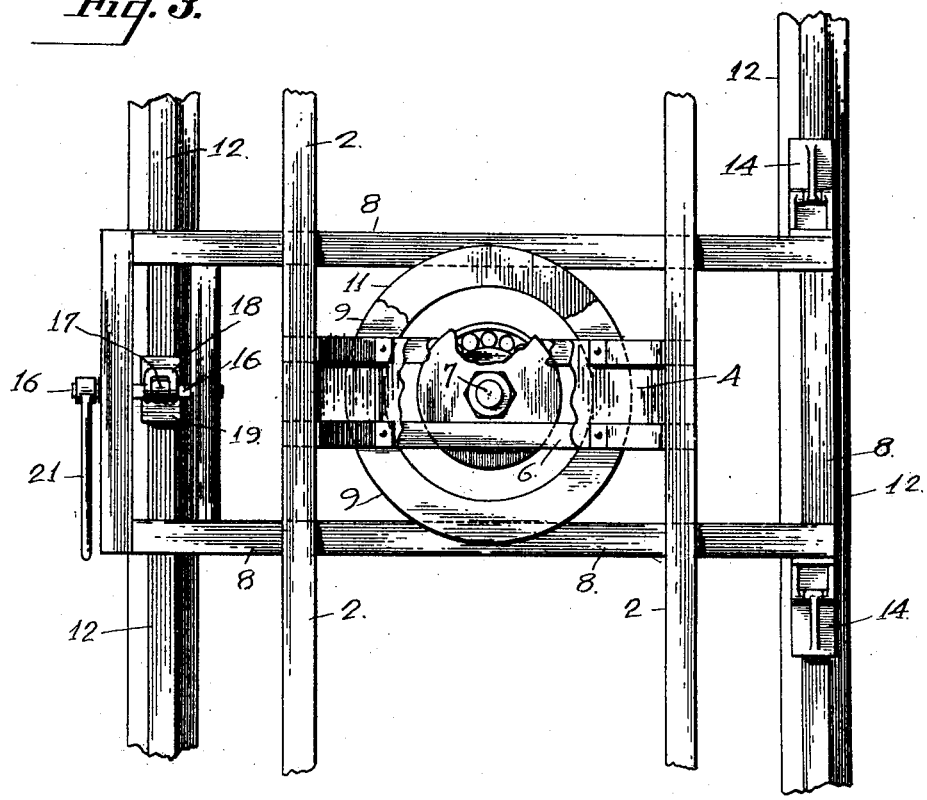
Fig. 3 is an enlarged broken view of a portion of the chassis of the vehicle and the frame in operative position on the rails.

Referring to the drawings the numeral 1 is used to designate a motor vehicle or the like having a chassis 2 provided with supporting wheels 3, said vehicle 1 being adapted for transit on rails, and of the type now in use in mountainous districts for hauling material.

A pair of transverse plates 4 are secured to the under side of the chassis 2 and held in spaced relation by means of suitable I-beams 6. A king bolt 7 is mounted centrally of the plates 4 and to the lower end of this king bolt 7 is pivotally mounted a frame or turn-table 8. A pair of fifth wheel members 9 and 11 are mounted upon the lower side of the lower plate 4 on the chassis 2 and upon the upper side of the frame 8 respectively, with sufficient distance between said members 9 and 11 to permit a tilting movement of the frame 8 relatively to the chassis 2, the purpose of which will hereinafter be more fully set forth.

The frame 8 is normally positioned longitudinally of the vehicle to prevent projection of the ends of said frame beyond the sides of said vehicle while in transit.

Pivotally mounted upon one end of the frame 8 and arranged to engage the tread of one of the supporting rails 12, when in a transverse position, upon which the vehicle travels, are a pair of shoes 14.

Figure 4:
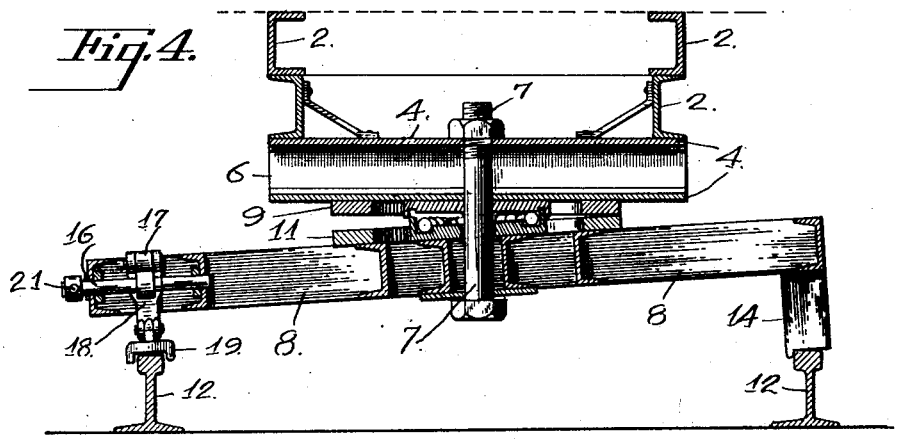
Fig. 4 is a transverse sectional view of Fig. 3.

These shoes 14 are arranged to engage the tread of the adjacent rail 12 when that end of the frame is tilted upwardly and to support and retain said end of said frame 8 in that position, as disclosed in Fig. 4 of the drawings.

Rotatably mounted in the opposite end of the frame 8 is a crank shaft 16 having a crank 17 thereon to which is pivotally connected one end of a link 18, the other end of said link being pivotally connected to a shoe 19 likewise arranged to engage the tread of the adjacent rail 12 when the frame 8 is positioned transversely to the vehicle 1, as disclosed in Fig. 4 of the drawings.

One end of the crank shaft 16 projects beyond the adjacent end of the frame 8 and is provided with a suitable lever 21 by means of which said crank shaft 16 may be partially rotated.

In operation, when it is desired to reverse the position of the vehicle 1 upon the ground or upon its rails, 12, the frame 8 is positioned transversely to the said vehicle 1 and the end of the frame 8 containing the shoes 14 is elevated by tilting said frame 8 and said shoes 14 are placed in engaging relation with the adjacent rail 12 to retain the said end of said frame 8 in such elevated or tilted position.

By means of the lever 21 the crank shaft 16 is now rotated to depress the link 18 and shoe 19 thereon and thereby elevate or raise that end of the frame 8 to a level with the other end thereof.

This action elevates the frame 8 and fifth wheel member 11 thereon to a horizontal position which in turn will elevate the chassis 2 and vehicle 1 until the wheels 3 are cleared from the rails 12, the fifth wheel members 9 and 11 thereby forming a sufficient broad rotative base upon which the vehicle may now be rotated to reverse its position.

After a reversal of the vehicle position has been obtained the lever 21 is operated to lower that end of the frame and the shoes 14 and 19 are moved to an inoperative or non-engaging position by partially rotating the same on their pivotal points as disclosed in dotted lines in Fig. 6 and full lines in Fig. 7 of the drawings. The frame 8 is not rotated on its king bolt 7 until it assumes a longitudinal position relatively to the vehicle 1, where it may be secured in such position by means of any suitable latch, not shown.

Upon arrival at the other end of the rails or journey, the above described operation is repeated to again reverse the position of the vehicle 1.

Having thus described my invention what I claim as new and desire to secure by Letters Patent is—

1. The combination with a vehicle adapted for transit upon rails of a frame pivotally mounted thereunder; and means pivotally mounted upon the frame and adapted to engage said rails and to elevate said frame and vehicle to clear the wheels thereof from said rails whereby the position of said vehicle upon said rails may be reversed.

2. The combination with a vehicle adapted for transit upon rails of a frame pivotally mounted below the center of gravity of said vehicle; shoes pivotally mounted upon the frame and adapted for engagement with said rails; and means for depressing one of said shoes to elevate the frame and vehicle to clear the wheels thereof from said rails whereby the position of said vehicle upon said rails may be reversed.

3. The combination with a motor vehicle adapted for transit upon rails of a frame pivotally mounted below the vehicle; a pair of shoes pivotally connected to one end of said frame and adapted for engagement with one of said rails; a crank shaft rotatably mounted on the other end of said frame; and a third shoe operatively connected with the crank shaft and adapted for engagement with the other rails whereby rotation of said crank shaft will depress the third shoe and elevate the frame and vehicle thereon to clear the wheels of said vehicle above said rails to facilitate reversal of the position of said vehicle upon said rails.

4. The combination with a motor vehicle adapted for transit upon rails, of a frame pivotally mounted below said vehicle and adapted to be moved longitudinally of said vehicle and between the wheels thereof; a fifth wheel member mounted upon the vehicle and concentric with the pivotal point of the frame; a second fifth wheel member mounted upon the frame and in registry with the first mentioned member; a pair of shoes pivotally connected to one end of the frame and adapted for engagement with one of said rails when moved transversely to the vehicle; a third shoe operatively connected with the other end of the frame and adapted for engagement with the other rail; and means mounted upon the frame and operatively connected with the third shoe and adapted to depress said third shoe to elevate the frame and vehicle to clear the wheels thereof from the rails whereby the position of said vehicle on said rails may be reversed.

5. The combination with a motor vehicle adapted for transit on rails of a frame mounted thereunder; a king bolt pivotally connecting the frame with the vehicle and arranged to permit tilting of said frame on said bolt; a pair of fifth wheel members mounted upon the vehicle and frame respectively and concentric with the king bolt; a pair of shoes pivotally connected to one end of the frame and adapted for engagement with one of said rails when said end is tilted uppermost; a third shoe pivotally mounted upon the other end of the frame and adapted for engagement with the other rail; and means operatively connected to the frame and adapted to depress the third shoe and thereby elevate the frame and fifth wheel member thereon to a horizontal position to engage and elevate the fifth wheel member and vehicle to which it is connected to a horizontal position to clear the wheels of said vehicle above said rails whereby the position of said vehicle on said rails may be reversed.

In witness whereof I hereunto set my signature.

OSCAR M. PRINCE.